United States Patent [19]
Voegtli et al.

[11] Patent Number: 5,965,657
[45] Date of Patent: Oct. 12, 1999

[54] AIR STABLE ADHESIVE STICK

[75] Inventors: Leo Paul Voegtli, Blountville; Shane Kipley Kirk, Church Hill, both of Tenn.

[73] Assignee: Eastman Chemical Company, Kingsport, Tenn.

[21] Appl. No.: 08/788,725

[22] Filed: Jan. 23, 1997

[51] Int. Cl.$^6$ ........................................... C08L 91/06
[52] U.S. Cl. ..................... 524/487; 524/488; 524/489; 523/164; 525/240
[58] Field of Search ..................... 524/487, 488, 524/489; 523/164; 106/268; 525/240

[56] References Cited

U.S. PATENT DOCUMENTS

| | | | |
|---|---|---|---|
| 3,220,966 | 11/1965 | Flanagan | 528/493 |
| 3,267,052 | 8/1966 | Brennan | 523/164 |
| 3,303,150 | 2/1967 | Coenen | 524/528 |
| 3,492,372 | 1/1970 | Flanagan | 525/210 |
| 3,539,481 | 11/1970 | Parker | 524/271 |
| 3,576,776 | 4/1971 | Muszik | 106/189.1 |
| 3,798,118 | 3/1974 | Jones | 524/274 |
| 3,846,363 | 11/1974 | Ando | 523/164 |
| 3,929,694 | 12/1975 | Columbus | 523/164 |
| 4,070,316 | 1/1978 | Combs et al. | 524/487 |
| 4,639,475 | 1/1987 | Dierichs | 523/164 |
| 4,749,739 | 6/1988 | Foster et al. | 524/274 |
| 5,262,216 | 11/1993 | Popat | 525/240 |
| 5,331,023 | 7/1994 | Columbus | 523/164 |
| 5,733,645 | 3/1998 | Somers | 525/240 |

FOREIGN PATENT DOCUMENTS

| | | |
|---|---|---|
| 87400168 | 12/1987 | European Pat. Off. . |
| 0 562 192 A1 | 8/1992 | European Pat. Off. . |

*Primary Examiner*—James J. Seidleck
*Assistant Examiner*—Olga Asinovsky
*Attorney, Agent, or Firm*—Jonathan D. Wood; Cheryl J. Tubach; Harry J. Gwinnell

[57] ABSTRACT

A solid, air stable adhesive composition containing wax and a polyolefin having a viscosity no greater than 2,000 centipoise and a needle penetration hardness of at least 50 dmm is disclosed. It is further disclosed that propylene-ethylene copolymer is the preferred polyolefin of the present invention.

19 Claims, No Drawings

{ 5,965,657 }

AIR STABLE ADHESIVE STICK

FIELD OF THE INVENTION

The present invention relates to solid adhesives. More particularly, the present invention relates to an air stable solid adhesive composition containing wax and a very low viscosity and very low hardness polyolefin.

BACKGROUND

An adhesive stick is a solid mass of adhesive which is used to transfer pressure sensitive adhesive to a substrate by rubbing the stick across the substrate. Adhesive sticks have been designed both for hand-held use and for adhesive transfer by machine. Adhesive sticks provide a simple alternative means of adhesive transfer wherein extraneous equipment such as heating equipment needed for hot melt adhesives or radiation sources needed for radiation curable adhesives are not required. However, existing adhesive sticks have practical drawbacks.

U.S. Pat. Nos. 4,639,475; 3,846,363; 3,929,694; and 3,576,776 disclose adhesive stick compositions. But the disclosed adhesive compositions must be stored in containers or special packaging to prevent the evaporation of volatiles. Prolonged exposure to air would cause adhesive compositions containing volatiles to decompose and become too dry and brittle to be useful. Air instability of adhesive sticks is especially problematic for adhesive sticks designed for hand-held use by the general public. Children are especially prone to leaving such art supplies uncapped or otherwise exposed for long periods.

U.S. Pat. No. 5,331,023 claims an adhesive stick composition containing a blend of polyisobutylene and a wax. The disclosed composition does not contain volatiles and is stable in air. However, the viscosity of the polyisobutylene raw material is about 15,300 to 46,000 centipoise. The use of a raw material having such high viscosity presents manufacturing difficulties.

The adhesive sticks disclosed in U.S. Pat. Nos. 3,539,481; 3,267,052; 3,267,052; 3,539,481; and 5,331,023 require significant frictional rubbing action of the stick across a substrate to cause the adhesive to be delivered in a satisfactory manner. These adhesive sticks are difficult to use due to their hardness.

In light of the above, it would be desirable to have a solid adhesive composition which is easily processable, stable in air, strong enough to withstand the force required for it's use, soft enough to readily transfer adhesive to a substrate, and having an adequate amount of bonding strength for usefulness on a variety of substrates.

SUMMARY

The adhesive composition of the present invention comprises a blend of:
  a) about 55 to 85 weight percent polyolefin having a penetration hardness of at least about 50 dmm and a viscosity no greater than about 2,000 centipoise at 190° C.; and
  b) about 15 to 45 weight percent wax. Another aspect of the present invention is an adhesive composition which comprises a blend of:
  a) about 40 to 75 weight percent polyolefin having a penetration hardness of at least about 50 dmm and a viscosity no greater than about 2,000 centipoise;
  b) about 15 to 45 weight percent wax; and
  c) about 5 to 30 weight percent tackifying resin.

DETAILED DESCRIPTION OF THE INVENTION

The applicants have unexpectedly discovered a solid, air stable adhesive composition which is comprised of wax and a polyolefin having very low viscosity and very low hardness.

It was surprising to find that a polyolefin having a viscosity no greater than 2,000 centipoise and a needle penetration hardness of at least 50 dmm would be suitable in forming a solid adhesive composition. But for convenience, the present invention is discussed and described further below by reference to the embodiment of the composition wherein the polyolefin component is an amorphous propylene-ethylene copolymer.

Propylene-ethylene copolymers have been widely used in hot-melt adhesive compositions which are far too hard to allow the transfer of adhesive at room temperature. Examples of propylene-ethylene copolymer based hot melt adhesives include U.S. Pat. Nos. 3,798,118; 3,492,372; and 3,220,966. Since hot melt adhesive compositions are so much harder than the present composition which is useful as an adhesive stick, it was surprising to find that some propylene-ethylene copolymers would be suitable as base polyolefins of the present adhesive composition.

The suitability of the propylene-ethylene copolymer in the present adhesive was further unexpected in light of U.S. Pat. No. 5,331,023 which discloses a solid air stable adhesive composition formed from polyisobutylene and wax. There is no suggestion in the literature that the propylene-ethylene copolymer of the present invention, having a viscosity of about 300 centipoise, would be a good substitute for polyisobutylene, having a viscosity of about 15,300 to 46,000 centipoise. The applicants were surprised that such a liquid-like base polyolefin, when combined with wax, forms a solid composition retaining so much of the tackiness of the liquid-like polyolefin. It is a benefit of the present invention that the lower viscosity polyolefin of the present invention has much better processability than high viscosity polyisobutylene.

The high adhesive strength of the present solid composition was further unexpected. Eastman Chemical Company publication WA-23 (April 1995) discloses that a particular propylene-ethylene copolymer that the applicants have found useful in the present adhesive composition (penetration hardness of at least 55 dmm, viscosity less than or equal to about 2,000 centipoise at 190° C.) demonstrates significantly poorer adhesive strength when used in pressure sensitive adhesive formulations than other, more viscous, propylene-ethylene copolymers outside of the scope of the present invention. Comparative results from that disclosure is shown below as Example 1. In light of that disclosure, it was surprising to find that the particular propylene-ethylene copolymers within the scope of the present adhesive composition do provide adequate adhesive strength in the composition of the present invention to make the composition useful as an adhesive.

The solid air stable adhesive composition of the present invention is a solid blend of about 55 to 85 weight percent polyolefin and about 15 to 45 weight percent wax. The particular polyolefin of the present invention has a penetration hardness of at least about 50 dmm and a viscosity less than or equal to about 2,000 centipoise at 190° C.

The preferred polyolefin of the present invention is propylene-ethylene copolymer. A method for making propylene-ethylene copolymer is disclosed in European Patent Application number 87400168.8, (publication #

0232201) filed Jan. 26, 1987. It is critical that the propylene-ethylene copolymer have the viscosity and hardness required by the present invention. Generally, the softer and tackier the copolymer, the better the present composition will work in forming an adhesive stick.

Hardness values given herein for the different components of the present composition and for the composition itself were measured by the needle penetration test under a force of 100 grams per 5 seconds at 25° C., determined according to ASTM D5. Hardness is reported as the length, in dmm's (tenths of mm), of needle penetration.

Suitable polyolefins for the present invention have a combination of a needle penetration hardness of at least 50 dmm and a viscosity no greater than about 2,000 centipoise at 190° C., determined according to ASTM D3236. The polyolefin of the present invention preferably has a needle penetration hardness of at least 75 dmm, with at least 90 dmm being more preferable. The viscosity of the polyolefin is preferably no more than 500 centipoise at 190° C., with no more than 300 centipoise being more preferable.

The $T_g$ (glass transition temperature) of the polyolefin of the present invention is preferably no greater than $(-20)°$ C. The $T_g$ is more preferably no more than $(-27°$ C.), with no more than $(-33°$ C.) being most preferable.

The preferred polyolefins of the present invention are the amorphous propylene-ethylene copolymer having the properties having the viscosity and hardness levels required by the present invention. However, any polyolefin meeting the viscosity and hardness requirements of the present invention will be suitable.

An especially suitable commercial polyolefin for the present invention is a propylene-ethylene copolymer known as the EASTOFLEX E-1003 polyolefin. EASTOFLEX E-1003 is an amorphous propylene-ethylene copolymer manufactured by Eastman Chemical Company having a penetration hardness of about 90 dmm, a $T_g$ of($-33°$ C.), and a viscosity of 300 centipoise at 190° C.

The wax component of the adhesive composition of the present invention is comprised of a wax or blend of waxes. The term "wax", as used herein, refers to both singular waxes and blends of two or more waxes. A large number of waxes are suitable for the present invention including microcrystalline waxes, paraffin wax, natural waxes, and polyethylene waxes. Suitable waxes must be able to transform the propylene-ethylene copolymer, or mixture of copolymer and tackifying resin, from a thick viscous liquid-like material into a relatively hard solid, while retaining enough tackiness from the polyolefin and tackifier to remain adhesive.

The preferred wax of the present composition has a hardness less than 10 dmm. The more preferred wax is a blend of paraffin wax and polyethylene wax. The preferred paraffin-polyethylene wax blend has a weight ratio of about 2:1 to 1:2, more preferably about 1:1. The preferred polyethylene wax for use in such blend has a viscosity of about 50 to 2,000 centipoise, a density of about 0.90 to 0.96 g/cc, a penetration hardness of less than 12 dmm, and a RBSP (ring and ball softening point) of about 100 to 125. Such polyethylene wax can be prepared by continuous polymerization by free radical initiation of ethylene in a zoned autoclave reactor at temperatures of 150 to 310° C. at a pressure of about 800 to 1600 atmospheres in the presence of a chain transfer agent such as acetaldehyde.

A particularly suitable commercially available polyethylene wax for blending with paraffin wax is EPOLENE N-21 (RBSP=120° C., penetration hardness=<0.1 dmm, density= 0.950 g/cm @ 25° C., acid number <0.05), manufactured by Eastman Chemical Company.

The concentration of polyolefin in the adhesive composition of the present invention, when no tackifying resin is present, is about 55 to 85 weight percent, with the remaining 15 to 45 weight percent of the composition being wax. Less than about 55 weight percent polyolefin would provide a composition having inadequate adhesive strength and would deliver an inadequate amount of adhesive. Less than about 15 weight percent wax would be deleterious because the composition would lack structural integrity and would deliver too much adhesive. The preferred compositional concentration of the adhesive composition of the present invention is about 70 to 80 weight percent polyolefin and about 20 to 30 weight percent wax.

The preferred embodiment of the adhesive composition of the present invention contains a tackifying resin. The tackifying resin adds a significant amount of adhesive strength to the solid adhesive stick. The tackifying resin used in the air stable adhesive composition according to present invention is selected from the group consisting of aliphatic hydrocarbon resins.

The tackifier used in the composition of the present invention is preferably selected from at least one of the groups consisting of hydrocarbon resins, synthetic polyterpenes, and rosin esters. The tackifier preferably has a RBSP of about 95 to 135° C. Suitable resins and rosin esters are the terpene polymers having the suitable RBSP such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing a mixture of sulphate terpene, and at least 20 percent of at least one other terpene selected from the group consisting of pinene, limonene, or dipentene.

The more preferred tackifying resins are selected from hydrocarbon resins such as disclosed in U.S. Pat. No. 3,850,858. These hydrocarbon resins preferably have a RBSP of about 100 to 130° C., an acid number of about 0 to 2, an acid value of less than about 1, and an iodine value of 75 to 100. These hydrocarbon tackifying resins can be prepared by the polymerization of monomers consisting primarily of olefins and diolefins and include, for example, the residual by-product monomers resulting from the manufacture of isoprene.

The compositional concentration of the present composition containing tackifier is about 40 to 75 weight percent polyolefin, preferably amorphous propylene-ethylene copolymer, about 5 to 30 weight percent tackifying resin, and about 15 to 45 weight percent wax. The preferred concentration of components is about 55 to 70 weight percent polyolefin, about 10 to 25 weight percent tackifying resin, and about 20 to 30 weight percent wax.

The air stable adhesive composition of the present invention can also contain other non-volatile compounds which do not deleteriously affect the desired properties of the composition. Examples of such additives include pigments, dyes, and clays.

The adhesive compositions of this invention are prepared by blending together the individual components in the melt at a temperature of about 120 to 130° C. until a homogeneous mixture is obtained. A homogenous mixture can normally be achieved rapidly. Various methods of blending materials of this type are known in the art and any method that produces a homogeneous mixture is satisfactory. These components blend easily in the melt and a heated vessel equipped with a stirrer is all that is required. The composition of the present invention is easily processable due to the low viscosities and low melting points of the individual blend components.

The adhesive composition of the present invention, either with or without a tackifying resin component, can be readily formed into shaped articles such as adhesive sticks, and the like. Application of the adhesive results from rubbing the stick across a substrate. The properties of the composition are such that the adhesive is readily distributed under the forces usually applied with the hand. Adhesive applicators can also be formed especially for delivery of adhesive by a machine or mechanical device. While the primary objective of this invention is an adhesive that is used without extraneous equipment, the composition can optionally be used in a manner similar to hot melt adhesives which are heated and subsequently applied to the substrate in liquid form.

The composition of the present invention is stable in air. The adhesive composition of the present invention does not dry out or otherwise change substantially in appearance or performance when exposed to air without a protective container or wrapper under ambient conditions over a period of years. However, some sagging would be acceptable at elevated temperatures.

The bond strength of the adhesive composition of the present invention will vary as a function of many factors such as: composition, amount of adhesive applied, uniformity of application, pressure applied in forming bonds, and the substrates involved. The composition of the present invention has enough adhesive strength that the composition forms a destructive bond between two pieces of white bond paper such that when the two substrates are rapidly pulled apart that the paper tears. With the preferred composition of the invention, paper tear occurs readily when the papers which had been adhered together with the present composition are pulled apart at a moderate speed. However, the adhesive composition of the present invention also includes removable adhesives having lower, but useful, adhesive strengths wherein, with a slow steady pull, it is possible to separate two adhered papers without tearing. Since there is no volatilization of solvents with use of the present adhesive composition, the removable bonding aspect of the composition maintains removability for a relatively long time.

The composition of the present invention is a solid having a useful balance of hardness and softness suitable for use as an adhesive stick. A stick formed from the present composition of a size suitable to be held in the hand will be hard enough that it will not flow under its own weight or under the force from hand-held use and application. Yet a stick formed from the present composition will be soft enough to deliver a sufficient amount of adhesive to a substrate.

The following examples are intended to illustrate the present invention but should not be interpreted as a limitation thereof.

EXAMPLES

Trademarked materials used in examples:

Several different commercially available polymers and compounds were used in the following examples. EASTOFLEX, EASTOTAC, AND EPOLENE are trademarks for raw material products available from Eastman Chemical Company. ESCOREZ tackifier resins are available from Exxon. WINGTACK tackifier resins are available from Goodyear. Tables 1, 2, and 3 provide descriptions of the commercially available raw materials used in the examples.

TABLE 1

Commercially Available Base Copolymers used in Examples

| TRADEMARK | COPOLYMER STRUCTURE | VISCOSITY @ 190° C. | PENETRATION HARDNESS dmm | $T_g$ (°C.) |
|---|---|---|---|---|
| EASTOFLEX D-127 | propylene-hexene | 13,000 cP | 40 | −32 |
| EASTOFLEX D-151 | propylene-ethylene | 1,500 cP | 55 | −21 |
| EASTOFLEX D-167 | propylene-ethylene | 25,000 cP | 35 | −33 |
| EASTOFLEX D-174 | propylene-hexene | 4,000 cP | 60 | −27 |
| EASTOFLEX E-1003 | propylene-ethylene | 250 cP | 100 | −33 |
| EASTOFLEX D-180 | propylene-ethylene | 500 cP | 85 | −32 |
| EASTOFLEX D-117 | propylene-ethylene | NA | NA | NA |
| EASTOFLEX M1030 | mixture of polyprop and propylene-ethylene copolymer | 3,000 cP | 25 | −10 |
| EASTOFLEX E1200 | propylene-ethylene | 20,000 | 30 | −22 |
| EASTOFLEX 1060 | propylene-ethylene | 6,000 | 40 | −23 |

All of the polyolefins shown in Table 1 are available from Eastman Chemical Company.
NA = information not available

TABLE 2

Commercially Available Tackifiers used in the Examples

| TRADEMARK | RING & BALL (°C.) | PENETR. HARDNESS (dmm) | DENSITY (g/cm @ 25° C.) | ACID NO. | VISC @ 190° C. (cP) | $M_w$ $M_n$ |
|---|---|---|---|---|---|---|
| EASTOTAC H-115 | 115 | <0.1 | 1.04 | <0.1 | 400 | 900 1,200 |
| EASTOTAC H-130 | 130 | <0.1 | 1.04 | <0.1 | 1,200 | 900 1,200 |
| EASTOTAC H-100 | 100 | <0.1 | 1.04 | <0.1 | 200 | 900 1,200 |
| ESCOREZ 5380 | 100 | <0.1 | 1.04 | <0.1 | 150 | 1,400 1,100 |

TABLE 2-continued

Commercially Available Tackifiers used in the Examples

| TRADEMARK | RING & BALL (°C.) | PENETR. HARDNESS (dmm) | DENSITY (g/cm @ 25° C.) | ACID NO. | VISC @ 190° C. (cP) | $M_w$ $M_n$ |
|---|---|---|---|---|---|---|
| WINGTACK 95 | 98 | NA | 0.94 | NA | NA | 1,800 1,130 |

NA = information not available.
$M_w$ is weight average molecular weight.
$M_n$ is number average molecular weight.

TABLE 3

Commercially Available Waxes used in the Examples

| TRADEMARK | RING & BALL SOFTENING POINT (°C.) | PENETRATION HARDNESS (dmm) | DENSITY (g/cm @ 25° C.) | ACID NO. |
|---|---|---|---|---|
| EPOLENE N-21 | 120 | <0.1 | 0.950 | <0.05 |
| EPOLENE C-15 | 102 | 4 | 0.906 | <0.05 |
| EPOLENE N-11 | 350 | 2 | 0.918 | <0.05 |
| MICROWAX 1365 | 110 | 1 | 0.908 | <0.05 |

Preparation of Adhesive Compositions:

All compositions shown in the following examples were prepared in a similar manner. All of the component materials were weighed out to obtain the percentages shown, combined in a vessel, and then heated slightly above the melting point of the component having the highest melting point. This was generally around 120–125° C. After melting, the mixture was lightly and rapidly stirred to achieve a homogenous blend which was subsequently cooled. When a cylindrical stick was desired, the material was poured into a mold and subsequently cooled.

Test Methods Used in Examples:

Hardness values given herein for the different components of the present composition and for the composition itself were measured using a needle penetration test under a force of 100 grams per 5 seconds at 25° C., determined according to ASTM D5. Hardness values shown correspond to length, in dmm's (tenths of mm), of needle penetration.

The Stick Hardness and Application Test involved applying adhesive to white bond paper by manually rubbing a ½ inch diameter stick formed from the compositions using normal hand force. The results of this test are driven primarily by the hardness of the adhesive composition. A composition is too soft when it tends to rub off on paper too rapidly, and in an undesirably thick manner. The target level of the adhesive is approximately 20 mg per 5 cm². The extremely soft compositions tested would be best described as viscous liquids. In the opposite extreme, the sticks were so hard or rubbery that very little adhesive was transferred to the paper. Both these extreme type compositions were given a rating of "poor". Results included ratings of "excellent", "good", "fair", and "poor".

The Paper Adhesion Test used was a pass/fail test using the following three types of papers: construction, white bond, and manila envelope. To conduct the tests, approximately 20 mg per 5 cm² adhesive composition was applied to the paper by rubbing. Then a second piece of the same type of paper without adhesive was placed on top of the applied adhesive. The two pieces of paper were then pressed together with a four pound roller. After waiting at least five minutes, the two sheets of paper were pulled apart at a moderate rate. A paper tear is a "pass". No paper tear is a "fail".

Example 1

This example illustrates that it was not obvious that the particular propylene-ethylene copolymer of the present adhesive composition would provide adequate bonding strength to a solid adhesive composition. Table 4 shows the results from 180° Peel Adhesion and Room Temperature Hold Power tests wherein different pressure sensitive amorphous propylene-ethylene copolymer adhesive bases were analyzed for bonding strength at room temperature. The EASTOFLEX E-1003, which has properties falling within the scope of component (a) of the present composition, performed significantly poorer than the other propylene-ethylene copolymers. Therefore, one generally skilled in the art would not have expected that particular copolymer would provide adequate bonding strength to the adhesive composition when blended with wax. This example is disclosed in Eastman Chemical Company publication WA-23 (April 1995).

TABLE 4

Polyolefin Adhesive Strengths

| AMORPHOUS POLYOLEFIN BASE | 180° PEEL ADHESION (g/mm) | ROOM TEMPERATURE HOLD POWER, MIN |
|---|---|---|
| EASTOFLEX E-1003 | 1.97 | 6 |
| D-117 | 78.6 | 664 |
| EASTOFLEX M1030 | 95.4 | 6,346 |
| EASTOFLEX 1060 | 110.3 | 1,886 |
| D-167 | 70.1 | 248 |
| EASTOFLEX E1200 | 93.9 | 965 |

Example 2

This example illustrates the importance of the type of copolymer, amorphous propylene-ethylene, and the particular properties required of the amorphous propylene-ethylene copolymer. All of the compositions tested and shown in Table 5 below had a compositional makeup of 57.5 weight percent amorphous polyolefin, 17.5 weight percent EASTO-TAC H-115 tackifying resin, 12.5 weight percent EPOLENE N-21 wax, and 12.5 weight percent paraffin wax.

As can be seen from Table 5, the adhesive composition containing the amorphous propylene-ethylene copolymer having relatively low viscosity, Example 2B, was found to be substantially better for use as a solid adhesive stick.

TABLE 5

Comparison of Different Polyolefins in Compositions

| | | Polyolefin Properties | | | Adhesive Composition Properties | | | |
|---|---|---|---|---|---|---|---|---|
| # | polyolefin | Visc. @ 190° C. (cP) | Hardness (dmm) | $T_g$ (°C.) | Stick Hardness & Applic. | Adhesion (construct paper) | Adhesion (white bond) | Adhesion (manilla envelope) |
| 2A | Prop/ Hexene Copoly | 13,000 | 40 | −32 | Poor | Fail | Fail | Fail |
| 2B | Prop/ Ethyl Copoly | 1,500 | 55 | −21 | Exc. | Pass | Pass | Pass |
| 2C | Prop/ Ethyl Copoly | 25,000 | 35 | −33 | Exc. | Fail | Fail | Fail |
| 2D | Prop/ Hexene Copoly | 4,000 | 60 | −27 | Poor | Fail | Fail | Fail |

Example 3

This example illustrates the importance of the concentrations of the different components of the adhesive composition of the present invention. Table 6 shows the effects of changing the concentration ratios of the propylene-ethylene copolymer, the tackifier, and the two waxes comprising the wax blend component of the composition. The results shown in Table 6 show that all of the compositions of Example 3 produced solid adhesive sticks. Even a "poor" rating on the Stick Hardness and Application Test corresponds to a material which functions as an adhesive stick. That is, it is a solid stick that dos apply adhesive to the substrate in sufficient quantities to achieve bonding without the stick bending (assuming a reasonable diameter of the stick).

All of the formulations of Example 3 acted as an adhesive with only one formulation failing on the Manila envelope substrate which requires a greater adhesive strength.

Table 6 illustrates that the sticks become softer as the amount of wax decreases. The "poor" examples in Table 6 have too little wax. Also illustrated is the importance of the ratio of the two waxes in the blend. Increased amounts of paraffin wax is shown to soften the composition.

TABLE 6

Effect of Component Concentrations on Composition Properties

| | weight percent of components | | | | Hard. | adhesion test | | |
|---|---|---|---|---|---|---|---|---|
| | | | wax blend | | % | | | |
| | poly | tack | polyeth | paraffin | Applic. | constr. paper | white bond | manila envel. |
| 3A | 57.27 | 12.73 | 15.00 | 15.00 | good | pass | pass | fail |
| 3B | 65.45 | 12.73 | 16.82 | 5.00 | good | pass | pass | pass |
| 3C | 55.38 | 24.62 | 5.00 | 15.00 | poor | pass | pass | pass |
| 3D | 52.27 | 17.73 | 7.50 | 22.50 | good | pass | pass | pass |
| 3E | 65.45 | 12.73 | 5.00 | 16.82 | poor | pass | pass | pass |
| 3F | 57.52 | 17.49 | 12.50 | 12.50 | good | pass | pass | pass |
| 3G | 52.27 | 17.73 | 22.50 | 7.50 | excel. | pass | pass | pass |
| 3H | 55.38 | 24.62 | 15.00 | 5.00 | good | pass | pass | pass |
| 3I | 52.27 | 20.23 | 22.50 | 5.00 | good | pass | pass | pass |
| 3J | 59.77 | 12.73 | 22.50 | 5.00 | excel. | pass | pass | pass |
| 3K | 59.77 | 12.73 | 5.00 | 22.50 | poor | pass | pass | pass |

TABLE 6-continued

Effect of Component Concentrations on Composition Properties

| | weight percent of components | | | | Hard. | adhesion test | | |
|---|---|---|---|---|---|---|---|---|
| | | | wax blend | | % | | | |
| | poly | tack | polyeth | paraffin | Applic. | constr. paper | white bond | manila envel. |
| 3L | 65.45 | 14.55 | 5.00 | 15.00 | poor | pass | pass | pass |
| 3M | 52.27 | 24.62 | 18.11 | 5.00 | excel. | pass | pass | pass |
| 3N | 60.41 | 19.59 | 15.00 | 5.00 | good | pass | pass | pass |
| 3O | 52.27 | 24.62 | 5.00 | 18.11 | poor | pass | pass | pass | poly = EASTOFLEX E-1003,
tack = EASTOTAC H-115,
polyeth = EPOLENE N-21

Example 4

This example further illustrates the importance of the concentration ratio of the propylene-ethylene copolymer of component (a) to the tackifying resin of component (c), in the preferred embodiment of the present adhesive composition wherein a tackifying resin is present. The results of two different compositions having a 25.0 weight percent wax component containing a 1.0:1.0 concentration ratio of EPOLENE N-21 wax and paraffin are shown below:

The composition of Example 4A was prepared using a 1.0:1.0 ratio of copolymer to tackifying resin. EASTOTAC E-1003 propylene-ethylene copolymer and EASTOTAC H-115 resin were used. The stick hardness and application test was good. The composition passed the construction paper adhesion test but failed the adhesion tests using white bond paper and manila envelope. Construction paper typically tears easier than the other two papers tested. Example 4A illustrates a composition in which too much tackifying resin was added.

The composition of Example 4B was prepared using a 7.0:1.0 ratio of copolymer to tackifying resin. EASTOTAC E-1003 propylene-ethylene copolymer and EASTOTAC H-115 resin were used. The stick hardness and application test was excellent. The composition passed all adhesion tests for construction paper, white bond paper and manila envelope.

Example 5

This examples demonstrates the limits of low and high wax levels in the adhesive composition of the present invention. The compositions tested had a concentration ratio of 3.29:1.0 propylene-ethylene copolymer to tackifier. The individual composition components comprised EASTOFLEX E-1003 copolymer, EASTOTAC H-115 tackifier, and a 1:1 ratio blend of EPOLENE N-21 wax and paraffin wax. The results are shown in Table 7 below.

TABLE 7

Effect of Wax Concentrations on Adhesive Composition

| # | Wax weight % | Stick Hardness & Applic. | Adhesion (Constr. Paper) | Adhesion (White Bond) | Adhesion (Manila Envelope) |
|---|---|---|---|---|---|
| 5A | 15.0 | fair | pass | pass | pass |
| 5B | 40.0 | excellent | pass | pass | pass |
| 5C | 50.0 | excellent | pass (slight tear) | fail | fail |

Example 6

This example demonstrates that the use of a tackifying resin in the adhesive composition of the present invention is preferred but optional, depending on the bond strength desired. Compositions for Examples 6A and 6B were made from 66.7 weight percent propylene-ethylene copolymer base, 15.15 weight percent EPOLENE-21 wax, 15.15 weight percent paraffin wax, and no tackifying resin. The results are shown in Table 8. As can be seen from a comparison with previous Examples, the presence of a tackifying resin improves the adhesive strength. But the results shown in Table 8 show that the adhesion of the composition within the scope of the present invention, 6A, has adequate adhesive strength.

TABLE 8

Adhesive Composition without Tackifying Resin

| # | Propylene-Ethylene Copolymer | Stick Hardness & Applic. | Adhesion (Constr. Paper) | Adhesion (White Bond) | Adhesion (Manila Envelope) |
|---|---|---|---|---|---|
| 6A | EASTOFLEX E-1003 | excellent | pass | pass | fail |
| 6B | EASTOFLEX D-180 | excellent | pass | pass | pass (some tear) |

Example 7

This Example illustrates the effect of using a single wax instead of a blend of waxes as the wax component. The compositions were made using a 3.0:1.0 ratio of EASTOFLEX E-1003 copolymer to EASTOTAC H-115 tackifier.

This example demonstrates that a single wax performs well when used in the above noted wax blends. Although none of the single wax compositions produced the excellent stick hardness and application properties that was obtained when a blend of waxes was used in the other examples, the composition using a single wax has adequate adhesive strength.

The results are shown in Table 9 below.

TABLE 9

Adhesive Composition using a Single Wax

| # | Wax | Weight % Wax | Stick Hardness & Applic. Test | Adhesion Tests constr paper | white bond | manila envel. |
|---|---|---|---|---|---|---|
| 7A | EPOLENE C-15 | 30 | Poor | Fail | Fail | Fail |
| 7B | EPOLENE N-11 | 30 | Fair | Pass | Pass | Pass |
| 7C | EPOLENE N-21 | 30 | Good | Pass | Pass | Pass |
| 7D | MICROCRYSTALLINE WAX, mp 76.6° C. | 30 | Poor | Pass | Pass | Pass |
| 7E | MICROWAX 1365 | 30 | Poor | Pass | Fail | Pass |
| 7F | PARAFFIN, 62.8° C. | 30 | Poor | Pass | Pass | Pass |
| 7G | EPOLENE C-15 | 20 | Poor | Pass | Pass | Pass |
| 7H | EPOLENE N-11 | 20 | Poor | Pass | Pass | Pass |
| 7I | EPOLENE N-21 | 20 | Good | Pass | Pass | Pass |
| 7J | MICROCRYSTALLINE WAX, mp 76.6° C. | 20 | Poor | Pass | Pass | Pass |
| 7K | MICROWAX 1365 | 20 | Poor | Pass | Pass | Pass |
| 7L | PARAFFIN, 62.8° C. | 20 | Fair | Pass | Pass | Pass |

Example 8

This example illustrates different formulations of the adhesive composition of the present invention. Table 10 shows satisfactory results for all of the samples tested. It can be easily seen from the representative samples in Table 10 that the adhesive composition of the present invention would be useful as a solid adhesive stick for a variety of needs.

TABLE 10

Some Adhesive Compositions of the Present Invention

| # | Polyolefin | Tackifier | Stick Hard. & Applic. | Adhesion Tests constr. paper | white bond | manila envel. |
|---|---|---|---|---|---|---|
| 8A | EASTOFLEX C-1003 | ESCOREZ 5380 | good | pass | pass | pass |
| 8B | EASTOFLEX D-180 | WINGTACK 95 | good | pass | pass | pass |
| 8C | EASTOFLEX D-180 | EASTOTAC H-115 | fair | pass | pass | pass |
| 8D | EASTOFLEX E-1003 | EASTOTAC H-115 | exc. | pass | pass | pass |
| 8E | EASTOFLEX E-1003 | WINGTACK 95 | exc. | pass | pass | pass |
| 8F | EASTOFLEX D-180 | EASTOTAC H-130 | good | pass | pass | pass |
| 8G | EASTOFLEX D-180 | EASTOTAC H-100 | fair | pass | pass | pass |

Example 9

Compositions of the present invention were made into sticks of 1-inch diameter and 6-inch lengths. One of the sticks was wrapped with a paper such that about ½-inch of adhesive was exposed on both ends of the stick. The stick was tested for application ease and bond strength. The stick applied a satisfactory level of adhesive with mild force and paper tear occurred consistently when paper was pulled apart rapidly. The stick was left exposed to ambient indoor environment for over fourteen months. The stick was again tested, and gave identical results. No observable changes in appearance had occurred.

We claim:

1. An adhesive composition comprising a blend of:
   a) about 55 to 85 weight percent polyolefin having a penetration hardness of at least about 50 dmm and a viscosity no greater than about 2,000 centipoise at 190° C.; and
   b) about 15 to 45 weight percent wax.

2. The composition according to claim 1 wherein said composition is a solid.

3. The composition according to claim 1 wherein said polyolefin is a propylene-ethylene copolymer.

4. The composition according to claim 3 wherein said propylene-ethylene copolymer is present in a concentration of about 70 to 80 weight percent and said wax is present in a concentration of about 20 to 30 weight percent.

5. The composition according to claim 3 wherein said propylene-ethylene copolymer has a penetration hardness of at least about 75 dmm.

6. The composition according to claim 3 wherein said propylene-ethylene copolymer has a $T_g$ no greater than about (−20)° C.

7. The composition according to claim 6 wherein said propylene-ethylene copolymer has a $T_g$ no greater than about (−33)° C.

8. The composition according to claim 3 wherein said propylene-ethylene copolymer has a viscosity no greater than about 300 centipoise at 190° C.

9. The composition according to claim 1 wherein said wax has a needle penetration hardness less than about 10 dmm.

10. The composition according to claim 9 wherein said wax consists of a blend of polyethylene wax and paraffin wax, wherein said blend has a concentration ratio of about 1:2 to 2:1.

11. The composition of according to claim 1 wherein said composition has sufficient adhesive strength so that the composition forms a destructive bond when applied between two sheets of white bond paper such that when the two sheets are rapidly pulled apart there is a paper tear.

12. An adhesive composition comprising a blend of:
   a) about 40 to 75 weight percent polyolefin having a penetration hardness of at least about 50 dmm and a viscosity no greater than about 2,000 centipoise;
   b) about 15 to 45 weight percent wax; and
   c) about 5 to 30 weight percent tackifying resin.

13. The composition according to claim 12 wherein said polyolefin is a propylene-ethylene copolymer.

14. The composition according to claim 13 wherein the concentration of said propylene-ethylene copolymer is about 55 to 70 weight percent, the concentration of said wax is about 20 to 30 weight percent, and the concentration of said tackifying resin is about 10 to 25 weight percent.

15. The composition according to claim 12 wherein said tackifying resin has a ring and ball softening point of about 95 to 135° C.

16. The composition according to claim 12 wherein said tackifying resin is a hydrocarbon tackifying resin.

17. A process for making a solid adhesive comprising blending, at a temperature of about 120 to 130° C., a mixture comprising about 55 to 85 weight percent propylene-ethylene copolymer having a penetration hardness of at least about 5 dmm and a viscosity no greater than about 2,000 centipoise at 190° C. and about 15 to 45 weight percent wax for a time sufficient to form a homogeneous blend.

18. An adhesive stick formed from the composition of claim 1.

19. An adhesive stick formed from the composition of claim 11.

* * * * *